US005743292A

United States Patent [19]

Robinson

[11] Patent Number: 5,743,292

[45] Date of Patent: Apr. 28, 1998

[54] PRESSURE ACTUATED CHECK VALVE

[75] Inventor: Norman F. Robinson, Manhattan Beach, Calif.

[73] Assignee: McDonnell Douglas Corporation, Huntington Beach, Calif.

[21] Appl. No.: 726,915

[22] Filed: Oct. 7, 1996

[51] Int. Cl.[6] .......... F16K 31/18

[52] U.S. Cl. .......... 137/493.9; 137/901

[58] Field of Search .......... 137/906, 901, 137/494, 493, 493.9, 522, 523, 102, 81.1

[56] References Cited

U.S. PATENT DOCUMENTS

| | | | |
|---|---|---|---|
| 2,192,141 | 2/1940 | McElwaine | 50/23 |
| 2,320,686 | 6/1943 | Waseige | 137/153 |
| 3,163,394 | 12/1964 | Downin | 251/120 |
| 3,856,266 | 12/1974 | McKendrick | 254/168 |
| 3,875,957 | 4/1975 | Veit et al. | 137/81 |
| 4,039,139 | 8/1977 | Bird | 137/901 |
| 4,130,051 | 12/1978 | Brudnicki | 137/81.1 |
| 4,813,446 | 3/1989 | Silverwater et al. | 137/198 |
| 5,018,935 | 5/1991 | Gage | 137/106 |
| 5,036,846 | 8/1991 | Aulgur et al. | 128/207.11 |
| 5,159,872 | 11/1992 | Dettmers et al. | 137/901 |
| 5,199,426 | 4/1993 | Aldworth et al. | 137/81.1 |
| 5,351,682 | 10/1994 | Foote | 137/81.1 |
| 5,394,900 | 3/1995 | Okuyuma et al. | 137/510 |

FOREIGN PATENT DOCUMENTS

| | | | |
|---|---|---|---|
| 1183760 | 12/1967 | United Kingdom | 137/901 |

*Primary Examiner*—Denise L. Ferensic
*Assistant Examiner*—Joanne Y. Kim
*Attorney, Agent, or Firm*—Bell Seltzer Intellectual Property Law Group of Alston & Bird, LLP

[57] ABSTRACT

A pressure controlled check valve that includes a valve casing having a first opening and a second opening, a poppet valve operationally disposed in the second opening of the valve casing for opening when the pressure in the valve casing is greater than or equal to the pressure on the other side of the poppet valve, and an aneroid valve actuator located within valve casing for opening the poppet valve for reverse flow when the pressure within the valve casing is less than a predetermined pressure.

3 Claims, 1 Drawing Sheet

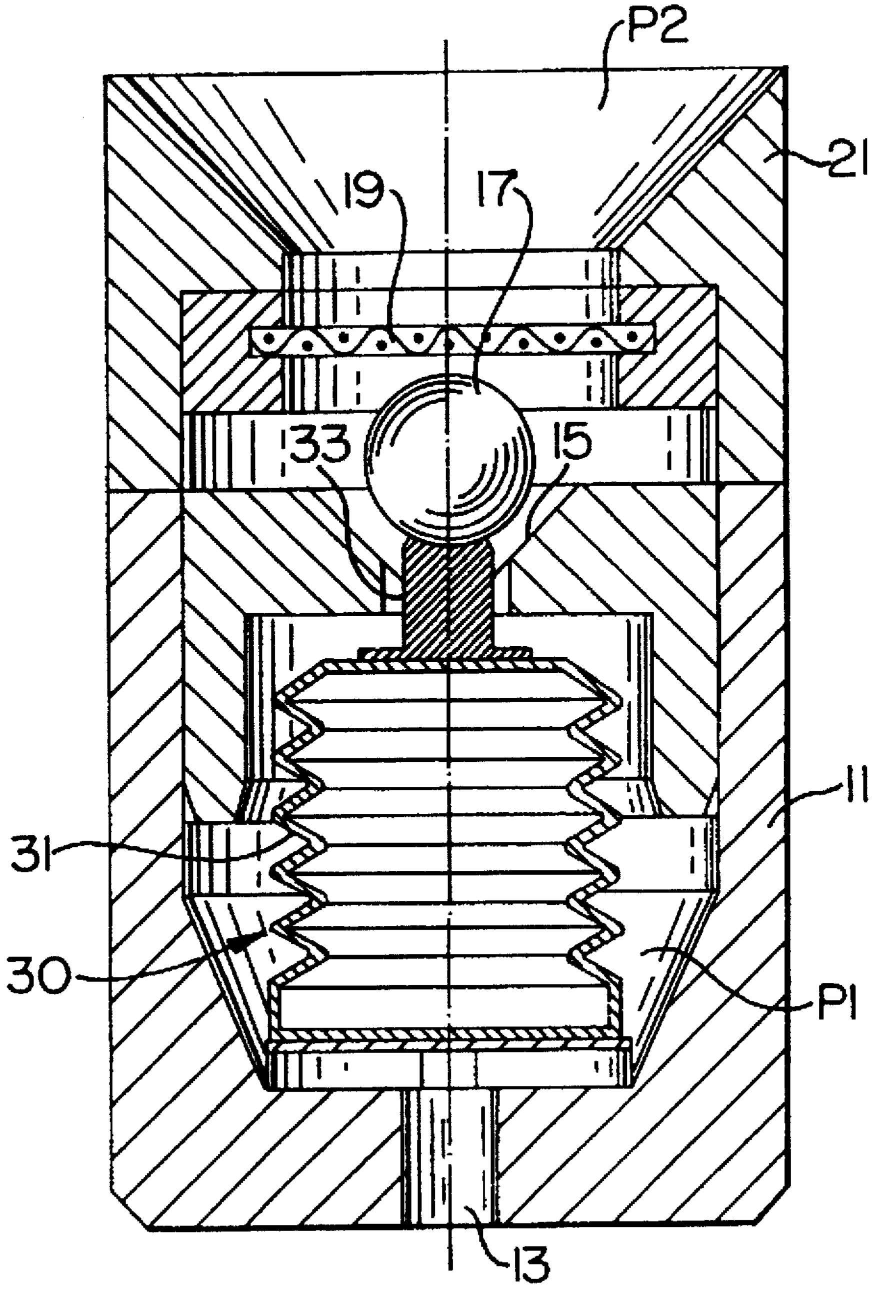
P2
21
19
17
133
15
11
31
30
P1
13

PRESSURE ACTUATED CHECK VALVE

BACKGROUND OF THE INVENTION

The disclosed invention is directed generally to a check valve for hydraulic systems, and more particularly to check valve that is controllably opened for return flow.

A known hydraulic valve designed to bleed free gas from an aircraft hydraulic system is comprised of a shuttle valve having an orifice that is open for a range of pressures but is closed at normal and low pressures. When the hydraulic system is started, pressure rises quickly through the "orifice open" range after free gases have passed and fluid causes the valve shuttle to move and close the orifice, which limits loss of hydraulic fluid after free gases have passed. On system shutdown however, pressure decay can be slow, particularly where the hydraulic system includes accumulators, and the pressure in the shuttle valve can dwell in the "orifice open" range for an extended period, which results in significant loss of fluid.

While a check valve could be used to trap the shuttle valve pressure above the "orifice open" range of pressures as the system pressure decays, the shuttle valve pressure would eventually have to be vented. This could be accomplished by an auxiliary valve that would be manually or automatically opened. However, the use of a auxiliary valve would add further complexity, since the shuttle valve pressure must be reliably vented on hydraulic system shut down so that the shuttle valve can properly bleed free gases on hydraulic system start up.

SUMMARY OF THE INVENTION

It would therefore be an advantage to provide a check valve for allowing hydraulic fluid flow out of the valve when pressure in the valve is increasing and for preventing fluid flow into the valve when pressure in the valve is decreasing until a predetermined pressure is reached, at which time the valve would open to allow return flow.

The foregoing and other advantages are provided by the invention in a check valve that includes a valve casing having a first opening and a second opening, a poppet valve operationally disposed in the second opening of the valve casing for opening when the upstream pressure in the valve casing is greater than the downstream pressure on the other side of the poppet valve, and an aneroid valve actuator located within the valve casing for opening the poppet valve when the upstream pressure within the valve casing is less than a predetermined pressure. In this manner, when pressure in the valve casing is decreasing relative to the pressure on the other side of the poppet valve, reverse flow is prevented until the pressure in the valve casing is less than the predetermined pressure.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic elevational cross-sectional view of a check valve in accordance with the invention.

DETAILED DESCRIPTION OF THE DISCLOSURE

In the following detailed description and in the several figures of the drawing, like elements are identified with like reference numerals.

Referring now to FIG. 1, schematically set forth therein is an elevational cross-sectional view of a check valve in accordance with the invention which includes a valve casing 11 having a passageway 13 at a first end thereof and an annular valve seat 15 disposed in an opening at a second end of the valve casing 11. A poppet or valve ball 17 is confined in the vicinity of an opening of the valve seat 15 by a screen 19 or other suitable capturing apparatus that is secured by a retaining bushing 21. The valve seat 15 and the valve ball 17 form a poppet valve having an input side that is within the valve casing 11 and an output side that is outside the valve casing, whereby the poppet 17 is urged toward the valve seat 15 by an output side or downstream pressure P2 that is greater than an input side or upstream pressure P1 that is within the valve casing 11.

In accordance with the invention, a pressure sensitive element 30 comprised of an aneroid bellows 31 and a poppet actuating rod 33 is disposed within the valve casing 11. The aneroid bellows 31 contracts as the upstream pressure P1 within the valve casing pressure increases, and the pressure sensitive element 30 is more particularly configured such that poppet is not affected by the actuating rod 33 when the upstream pressure P1 in the valve casing 11 is above a predetermined pressure. When the upstream pressure P1 is less than such predetermined pressure, the actuating rod 33 causes the valve ball 17 to unseat.

The check valve of FIG. 1 operates as follows when used, for example, in conjunction with a known hydraulic bleed valve that is designed to bleed free gas from an aircraft hydraulic system and which includes a shuttle valve having an orifice that is open for a range of pressures but is closed at normal and low pressures. The upstream pressure Pi is the pressure communicated by a hydraulic reservoir, while the downstream pressure P2 is the pressure in the hydraulic bleed valve.

When the hydraulic system is started, the pressure sensitive element 30 is extended, and the valve ball 17 is unseated so that there is free flow between the P1 region and the P2 region. The upstream pressure PI rises, and eventually the pressure sensitive element 30 contracts and has no effect on the position of the valve ball 17 at medium and high pressures. Such contraction occurs before the upstream pressure PI reaches normal operating pressure, and while the pressure P1 continues to rise after the pressure sensitive element contracts, the downstream pressure P2 is equal to the upstream pressure P1 such that there is free forward flow through the poppet valve. By the time normal operating pressure is reached, the bleed valve is closed and there is no flow out of the P2 region, and the pressure P2 remains equal to the pressure P1.

When the hydraulic system is shut down, the upstream pressure P1 decreases, which causes the poppet 17 to seat and trap the downstream pressure P2 at close to the operating pressure reached by the upstream pressure Pi. The downstream pressure P2 thus remains constant as the pressure P1 decreases, at a level that is greater than the "orifice open" pressure range of the bleed valve that is in communication with the downstream pressure P2. When the upstream pressure P1 has decreased to a predetermined level that is less than the "orifice open" pressure range of the bleed valve that is in communication with the downstream pressure P2, the pressure sensitive element 30 expands with sufficient force to unseat the check valve ball 17, which allows reverse flow through the poppet valve such that the trapped downstream pressure P2 vents to the reservoir that is in communication with the pressure P1 inside the valve casing. The downstream pressure P2 rapidly decreases through the "orifice open" pressure range of the bleed valve, and outflow from the bleed valve is minimized.

Effectively, the disclosed pressure sensitive check valve allows free forward flow through a ball valve, and prevents back flow until the upstream pressure P1 has fallen below a predetermined threshold.

Although the foregoing has been a description and illustration of specific embodiments of the invention, various modifications and changes thereto can be made by persons skilled in the art without departing from the scope and spirit of the invention as defined by the following claims.

What is claimed is:

1. A check valve comprising:

a valve casing having a first opening and a second opening;

valve means operationally disposed in said valve casing, said valve means having a first side exposed to a first pressure inside the valve casing and a second side exposed to a second pressure outside the valve casing, and configured to open when the pressure inside said valve casing is greater than or equal to said second pressure outside the valve casing; and pressure sensitive control means located within said valve casing for opening said valve means for reverse flow when the pressure within said valve casing is less than a predetermined pressure, said pressure sensitive control means comprising a prefilled aneroid bellows filled with a predetermined quantity of gas.

2. The check valve of claim 1 wherein said valve means comprises a poppet valve having a valve ball.

3. The check valve of claim 2 wherein said pressure sensitive means further comprises an actuating rod advanced by said bellows for engaging said valve ball.

* * * * *